(12) United States Patent
Terauchi (10) Patent No.: US 7,614,575 B2
(45) Date of Patent: Nov. 10, 2009

(54) ELECTRIC REEL FOR FISHING

(75) Inventor: Takashi Terauchi, Tokorozawa (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 12/014,167

(22) Filed: Jan. 15, 2008

(65) Prior Publication Data

US 2008/0173744 A1   Jul. 24, 2008

(30) Foreign Application Priority Data

| Jan. 23, 2007 | (JP) | ............................. 2007-012605 |
| Jan. 24, 2007 | (JP) | ............................. 2007-014285 |
| Jul. 12, 2007 | (JP) | ............................. 2007-183665 |

(51) Int. Cl.
*A01K 89/01* (2006.01)

(52) U.S. Cl. ...................................... 242/225; 242/251

(58) Field of Classification Search ................ 254/225, 254/250, 251
See application file for complete search history.

(56) References Cited

FOREIGN PATENT DOCUMENTS

| JP | 3008695 U | 12/1994 |
| JP | 08116837 A | * 5/1996 |
| JP | 3159619 B2 | 2/2001 |
| JP | 2003324924 | * 11/2003 |

* cited by examiner

*Primary Examiner*—Emmanuel M Marcelo
(74) *Attorney, Agent, or Firm*—Sughrue Mion, PLLC (57) ABSTRACT

The electric reel for fishing includes a spool rotatably supported between the side plates of a reel body and a driving motor arranged on the reel body for driving and rotating the spool. A concave part is formed on the reel body, an armature is rotatably arranged inside the concave part and a magnet constituting a magnetic field is mounted on the inner surface of the concave part opposed to the armature to constitute a driving motor for driving and rotating the spool.

5 Claims, 8 Drawing Sheets

ELECTRIC REEL FOR FISHING

BACKGROUND OF THE INVENTION

The present invention relates to an electric reel for fishing comprising a driving motor for driving and rotating a spool supported rotatably on a reel body.

Generally, for fishing in a fish layer in depth such as fishing on a ship, an electric reel for fishing (hereinafter referred to as an electric reel also) is often used. Such an electric reel incorporates into the reel body a driving motor for driving and winding a spool. For example, there are known a so-called a spool-in type accommodating a driving motor in the internal space of a spool as described in JP-UM-3008695 and a spool-out type accommodating a driving motor in a cylindrical motor case formed between the side plates of the reel body ahead of the spool as described in Japanese Patent No.3,159,619.

With any type of electric reel, the driving motor accommodates a stator and an armature in a cylindrical housing. Such a unit-based driving motor is accommodated in a motor case provided on the reel body.

Electric reels such as those described in Patent JP-UM-3008695 and Japanese Patent No.3,159,619 are facing growing needs for a more compact and higher-output design although the performance of a driving motor to be incorporated has limitations described below. An attempt to downsize a reel body necessarily leads to a more compact motor case accommodating a driving motor. The size of the driving motor in the motor case has to be reduced, which means that the driving motor delivers lower output. To obtain high output from a driving motor, a driving motor unit including an armature as a component member of the driving motor, a cylindrical housing accommodating the armature, and a field magnet attached inside the housing must be upsized, which results in a larger-sized reel body.

SUMMARY OF THE INVENTION

The invention has been accomplished in view of the above problems. An object of the invention is to provide an electric reel for fishing comprising a reel body of a reduced size with a current driving motor output or a reel body of the current size with an enhanced driving motor output.

In order to achieve the object, the present invention provides the following arrangements.

(1) An electric reel for fishing comprising:
  a reel body that includes side plates and a concave part;
  a spool rotatably supported between the side plates;
  a driving shaft including an armature rotatably arranged inside the concave part;
  a magnet that constitutes a magnetic field and is mounted on an inner surface of the concave part so as to be opposed to the armature to form a driving motor for driving and rotating the spool.

(2) The electric reel according to (1), wherein
  the reel body includes a frame on which a driving force transmitting mechanism is mounted and to which the side plate is attached, and
  the concave part is integrally formed with the frame.

(3) The electric reel according to (1), wherein the concave part is formed on the reel body positioned ahead of the spool.

(4) The electric reel according to (1), wherein the concave part is formed on the reel body so as to be positioned inside the spool.

(5) The electric reel according to (1) further comprising a detachable cover body for covering an opening in the concave part to make replaceable components of the driving motor including at least one of armature and magnet provided in the concave part.

(6) The electric reel according to (5) further comprising:
  a planetary gear mechanism including a sun gear for decelerating and transmitting a rotation of the driving shaft to the spool; and
  a bearing for rotatably supporting the driving shaft to the reel body in proximity to the planetary gear mechanism,
  wherein the sun gear and the bearing are attached and locked to the driving shaft.

(7) The electric reel according to (1) further comprising a cover body for covering an opening in the concave part,
  wherein a bearing for rotatably supporting the driving shaft and a one-way clutch for allowing the driving shaft to rotate in one direction and inhibiting the driving shaft from rotating in the other direction are retained inside the cover body.

With this configuration, the driving motor for driving and rotating the spool has a magnet as its component member constituting a magnetic field mounted on the inner surface of the concave part formed on the reel body and an armature arranged in the concave part thus utilizing the component member of the reel body as part of a component member of the driving motor. This arrangement omits at least a related art housing part constituting a driving motor and makes it possible to downsize the reel body while maintaining the output of a driving motor or enhancing the output of the driving motor while maintaining the size of the reel body. The concave part formed in the reel body is a part on the inner surface of which is mounted a magnet constituting a magnetic field. The shape, size or location of the concave part may be changed as required.

The invention provides an electric reel for fishing comprising a reel body of a reduced size with a current driving motor output or a reel body of the current size with an enhanced driving motor output.

DETAILED DESCRIPTION OF PREFERRED EMBODIMENTS

Embodiments of the invention will be described referring to drawings.

First Embodiment

Figure 1:
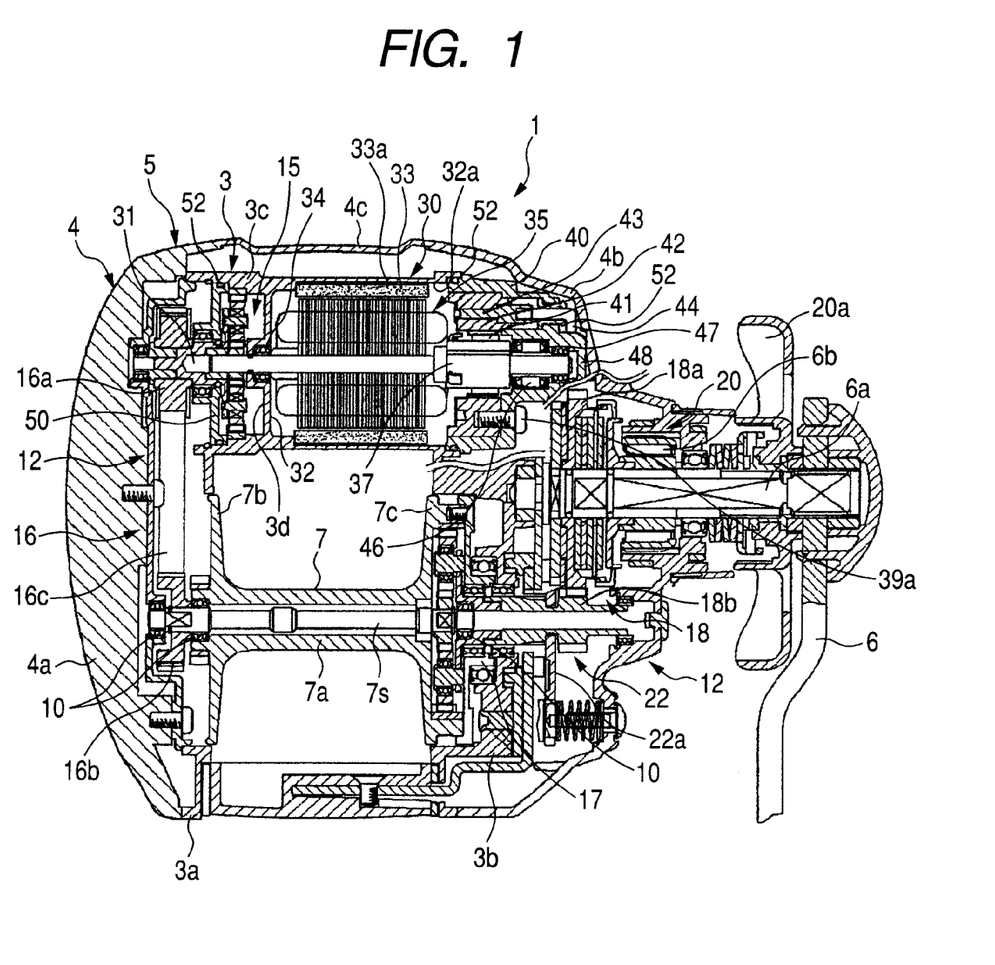
FIG. 1 is a plan view showing an internal structure of an electric reel according to a first embodiment of the invention.
Figure 2:
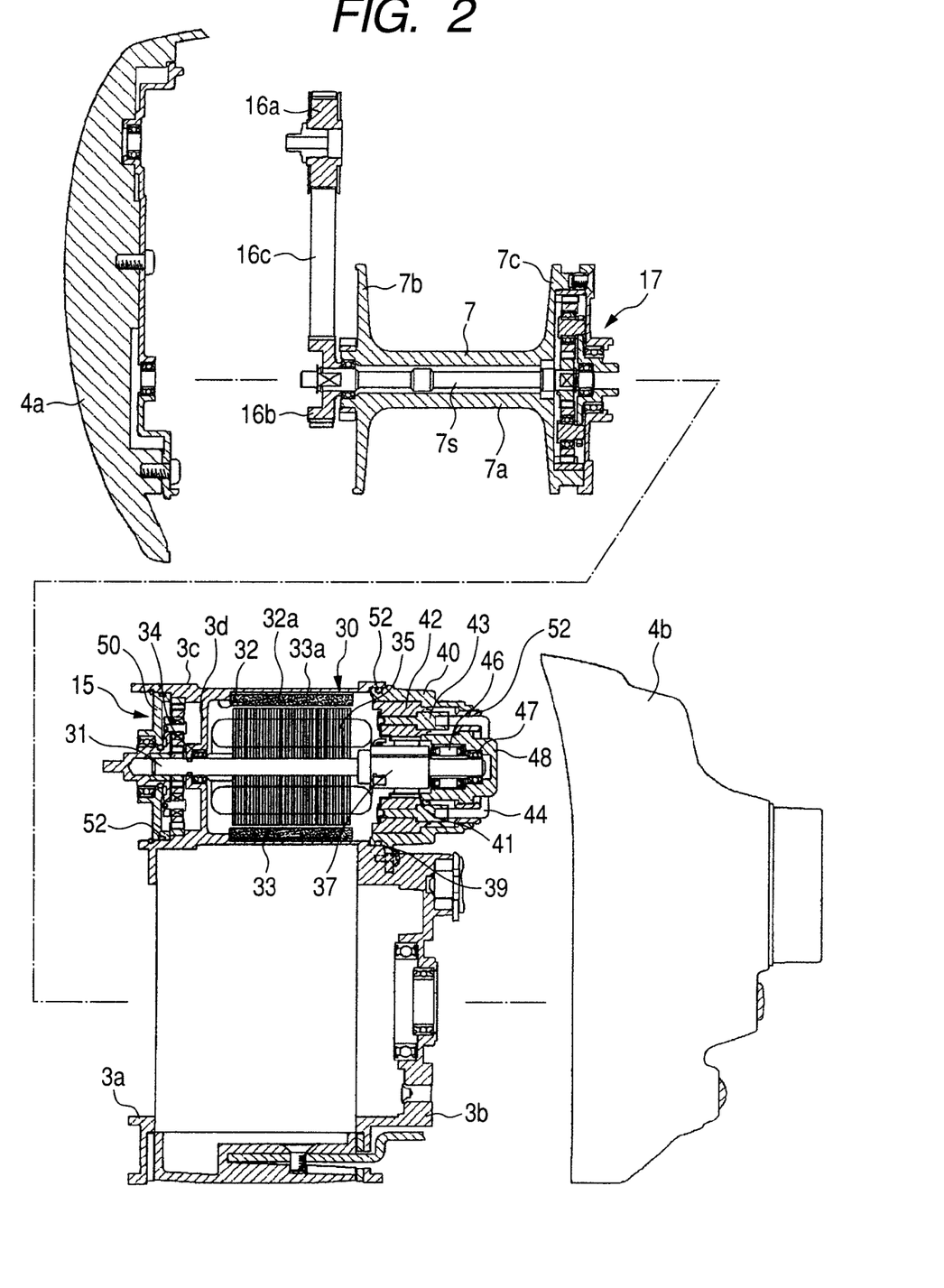
FIG. 2 is an exploded view of the main parts of the electric reel shown in FIG. 1.
Figure 3:
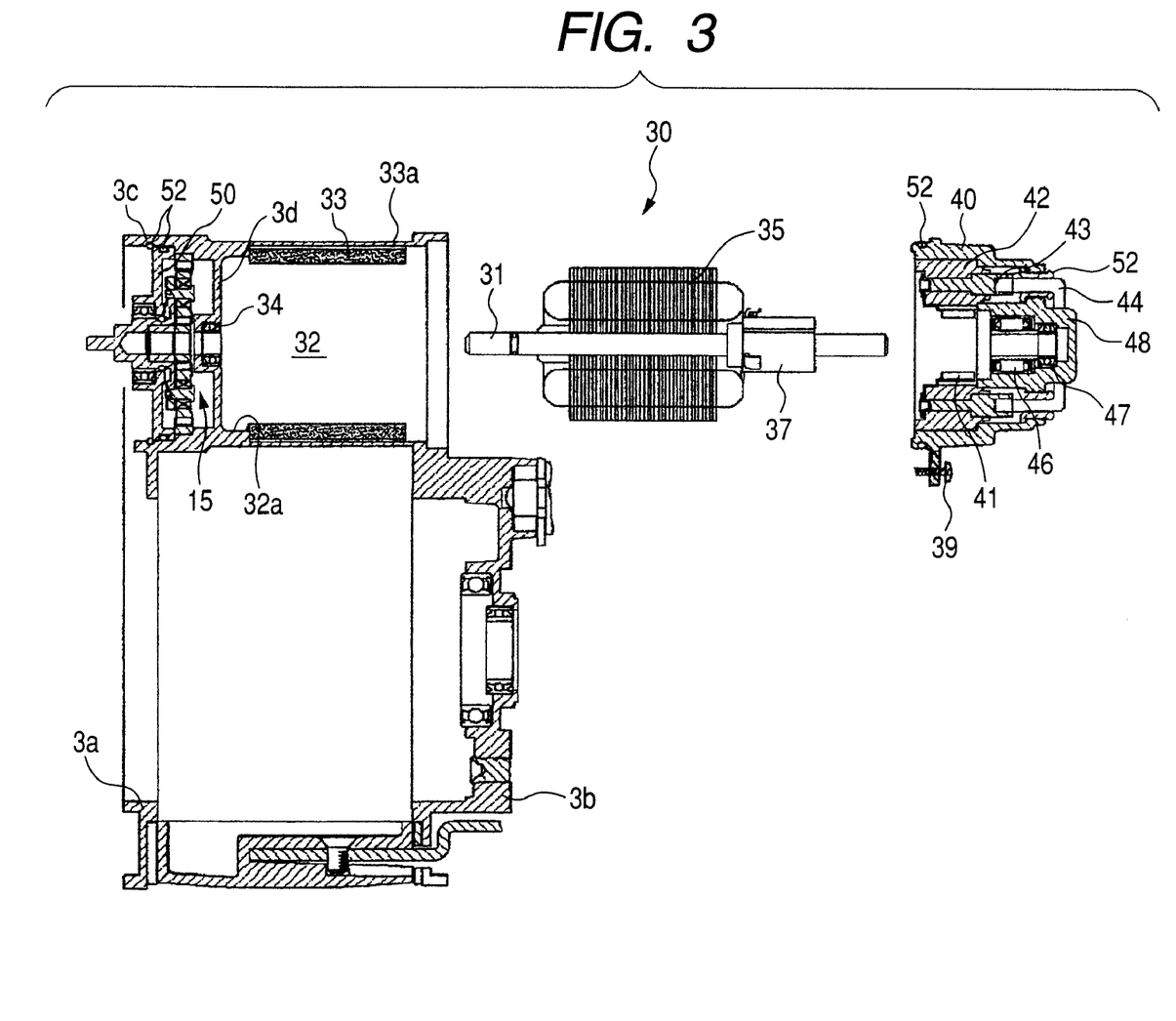
FIG. 3 is an exploded view showing the structure of a driving motor part.

FIGS. 1 through 3 show an electric reel according to a first embodiment of the invention. FIG. 1 is a plan view showing the internal structure of the electric reel. FIG. 2 is an exploded view of the main parts of the electric reel shown in FIG. 1. FIG. 3 is an exploded view showing the structure of a driving motor part.

An electric reel 1 according to this embodiment comprises a reel body 5 including a frame 3 mounting a driving force transmitting mechanism described later and an outer side plate 4 arranged to cover the frame 3.

In this embodiment, the frame 3 of the reel body 5 includes a left frame 3a, a right frame 3b and a front frame 3c arranged ahead of a spool. These frames 3a, 3b, 3c are integrated as a whole. As shown in FIG. 2, the left frame 3a, the right frame 3b and the front frame 3c of this embodiment are integrally formed. These frames 3a, 3b, 3c may be formed of integrated members by way of fixing means or partially integrated and integrally formed as a whole. The structure of each of the frames is not limited to a specific structure.

An outer side plate 4 of the reel body 5 includes a left outer side plate 4a covering the left frame 3a, a right outer side plate 4b covering the right frame 3b, and a front outer side plate 4c covering the front frame 3c and covers components such as a driving force transmitting mechanism as well as serves as a portion grasped and held by an angler (a portion with which the hand of an angler is in contact). These outer side plates 4a, 4b, 4c are individually integrated and integrally formed as a whole. Same as the above frames, the outer side plates 4a, 4b, 4c may be formed integrally formed or partially integrated and integrally formed as a whole. The frame 3a, 3b or 3c may be partially exposed.

A manual handle 6 for winding operation is arranged on one side plate (right side plate 4b) of the reel body 5. A spool 7 onto which a fishline is wound is rotatably supported between the left and right frames 3a and 3b of the reel body 5. A driving motor 30 having a structure described later is arranged ahead of the spool 7. The spool 7 is driven and rotated in a fishline winding direction via a driving force transmitting mechanism described later by way of the winding operation of the manual handle 6 and rotation driving of the driving motor 30.

The spool 7 includes a fishline winding drum part 7a onto which a fishline is wound. The spool 7 includes, at both ends thereof, flanges 7b, 7c for controlling a fishline to be wound. The spool 7 is rotatably supported by a spool shaft 7s via a bearing and rotatably supported between the left and right side plates. Both ends of the spool shaft 7s are supported against the reel body 5 via a bearing 10.

A rotary driving force is inputted to the spool 7 via the driving force transmitting mechanism 12 from the manual handle 6 and the driving motor 30. The general configuration of a driving force transmitting mechanism 12 will be described.

The driving force transmitting mechanism 12 of the embodiment is distributively arranged on the left frame 3a and the right frame 3b. A first decelerating mechanism 15 for reducing the output of the driving motor 30 and a motor power transmitting mechanism 16 for transmitting a rotary driving force reduced by the first decelerating mechanism 15 to the spool shaft 7s are arranged on the left frame 3a. A second decelerating mechanism 17 for reducing the rotary driving force of the spool shaft 7s and transmitting the reduced rotary driving force to the spool 7 and a manual power transmitting part 18 for transmitting the rotary driving force of the driving shaft (handle shaft) 6a of the manual handle 6 to the spool 7 via the second decelerating mechanism 17 are arranged on the right frame 3b.

In this example, the first decelerating mechanism 15 is composed of a known planetary gear mechanism arranged between the output shaft (driving shaft) 31 of the driving motor 30 and the front frame 3c. The motor power transmitting mechanism 16 includes a pulley 16a rotating integrally with the output shaft 31, a pulley 16b rotating integrally with the spool shaft 7s, and a power transmitting belt 16c wound by these pulleys 16a, 16b. The second decelerating mechanism 17 is composed of a known planetary gear mechanism arranged between the spool shaft 7s and the spool 7. The manual power transmitting part 18 includes a driving gear 18a rotatably mounted on a handle shaft 6a and a pinion gear 18b engaged with the driving gear 18a.

A known dragging mechanism 20 is arranged between the handle shaft 6a and the driving gear 18a. By rotating the dragging knob 20a mounted on the handle shaft 6a, a desired braking force is exerted on the rotation of the spool 7. A reverse rotation preventing mechanism 6b is provided on the handle shaft 6a for blocking the ganged rotation of the manual handle 6 when the driving motor 30 is driven and rotated.

The pinion gear 18b is arranged rotatably on an extended portion of the spool shaft 7s facing the right side plate and movably in the axial direction. A known clutch mechanism 22 is engaged on the circumferential part of the pinion gear 18b. The pinion gear 18b has a clutch operation member 22a sliding axially by the operation of an operation lever (not shown). This causes the clutch operation member 22a to be engaged/disengaged with/from the carrier of the second decelerating mechanism (planetary gear mechanism) thus connecting or disconnecting transmission of a driving force to the spool 7.

Next, the configuration of the driving motor 30 will be detailed.

The driving motor 30 according to the invention includes a concave part on a member of the reel body 5 and a magnet constituting a magnetic field on the inner surface of this concave part as well as an armature arranged inside the concave part. The concave part formed on the reel body functions as a casing in which is attached a magnet as a component of the driving motor generating a magnetic field.

To be more precise, in this embodiment, a concave part 32 defining a cylindrical space is formed on the front frame 3c (reel body positioned ahead of the spool 7) constituting the reel body 5 and the magnet 33 constituting a magnetic field is mounted on its inner surface 32a in the circumferential direction. The magnet 33 may be fixed to the inner surface 32a with an adhesive or locked thereto with holding means, or plural magnets 33 may be mounted at predetermined spacings along the circumferential direction. While a cylindrical yoke 33a forming a magnetic circuit to prevent leakage of magnetism is mounted on the magnet 33, the frame 3c may be provided with the function of such a yoke.

The front frame 3c including the concave part 32 formed thereon has an opening in a position facing a right side plate and a bottom wall 3d formed thereon in a position facing a left side plate. The front frame 3c rotatably supports, at the center of the bottom wall 3d, the driving shaft 31 via a bearing 34.

The driving shaft 31 has an armature 35 (coil opposed to the magnet 33) as a component member of the driving motor 30 in a position opposed to the magnet 33 mounted on the inner surface 32a of the concave part 32 and a commutator 37 providing an electric current to the armature 35 mounted on a right side plate in the axial direction of the armature 35.

The commutator 37 protrudes from the opening (opening in the concave part 32) in the front frame 3c in a position facing the right side plate. An end cover 40 is attached to the opening so as to be detachable to the front frame 3c by way of a fastening screw 39 threaded into the right frame 3b close to the front frame 3c. The end cover 40 is previously formed as a single unit and incorporates a brush 41 coming into contact with the commutator 37 and a brush holder 42 holding the brush attached and fixed to the inner surface thereof in the radial direction with a screw 39a. A terminal 43 is integrated into the brush holder 42 for connection to an external power source via a lead wire 44.

The end cover 40 incorporates, in the order from the innermost position in axial direction, a one-way clutch 46 for rotatably supporting the driving shaft 31 and a holding body 48 holding a bearing 47 rotatably supporting the driving shaft. In this example, the one-way clutch 46 does not freewheel when the manual handle 6 is rotated and allows the driving shaft 31 to rotate only in one direction so as to transmit power to the spool 7 when the driving motor is driven.

The first decelerating mechanism 15 composed of the planetary gear mechanism is arranged outside the bottom wall 3d in axial direction and blocked by an end cover 50 attached to the front frame.

As described earlier, the driving motor 30 for driving and rotating the spool 7 has the magnet 33 as its component member constituting a magnetic field mounted on the inner surface of the concave part 32 formed on the reel body 5 and the armature 35 arranged in the concave part 32. The component member (frame 3) of the reel body 5 serves as part of the component member of the driving motor 30 (casing to generate a magnetic field).

Thus, a housing part constituting the driving motor used for a related art electric reel is omitted. This downsizes the reel body 5 while maintaining the output or upsizes the armature 35 constituting the driving motor 30 to enhance the output while maintaining the size of the reel body 5. The casing is integrated with the frame. This provides a lightweight, compact electric reel thus enhancing the operability or usability at a fishing site.

The related art electric reel has a so-called double structure where a driving motor including a housing is accommodated in a case formed on the reel body. With the invention, the above structure is employed and the driving motor part has a single structure. A region in direct contact with outside air of a heat-dissipating part (frame part constituting a motor housing) is expanded thus enhancing the heat dissipation. This avoids troubles caused by the heat inside thus enhancing the durability of a driving motor and winding efficiency. In particular, with a spool-out type electric reel, a portion where a concave part as a housing is formed may be directly exposed to outside air. This further enhances heat dissipation and prevents troubles caused by heat.

The concave part 32 may be a portion on the inner surface of which is mounted a magnet 33 constituting a magnetic field. The shape, size or location of the concave part 32 may be changed as required. The concave part 32 may be integrated to an outer side plate instead of being formed on the frame, or formed across the frame 3 and an outer side plate 4.

With this configuration, a seal member 52 is preferably arranged in several locations so as to enhance the watertight property of the driving motor 30 for the reel body 5. Such a seal member 52 may be composed of an O-ring or a cover body formed by a rubber or silicon material. In this embodiment, the seal members 52 are arranged between the end cover 40 and the front frame 3c, between the end cover 40 and the lead wire 44, between the end cover 50 and the front frame 3c, and between the end cover 50 and the driving shaft 31.

Such a seal member 52 is arranged in position so as to keep watertight the interior of the concave part where the armature part of the driving motor 30 is arranged and changed as required depending on the position, size or shape of the concave part as well as the installation mode of the component member of the driving motor.

Second Embodiment

Figure 4:
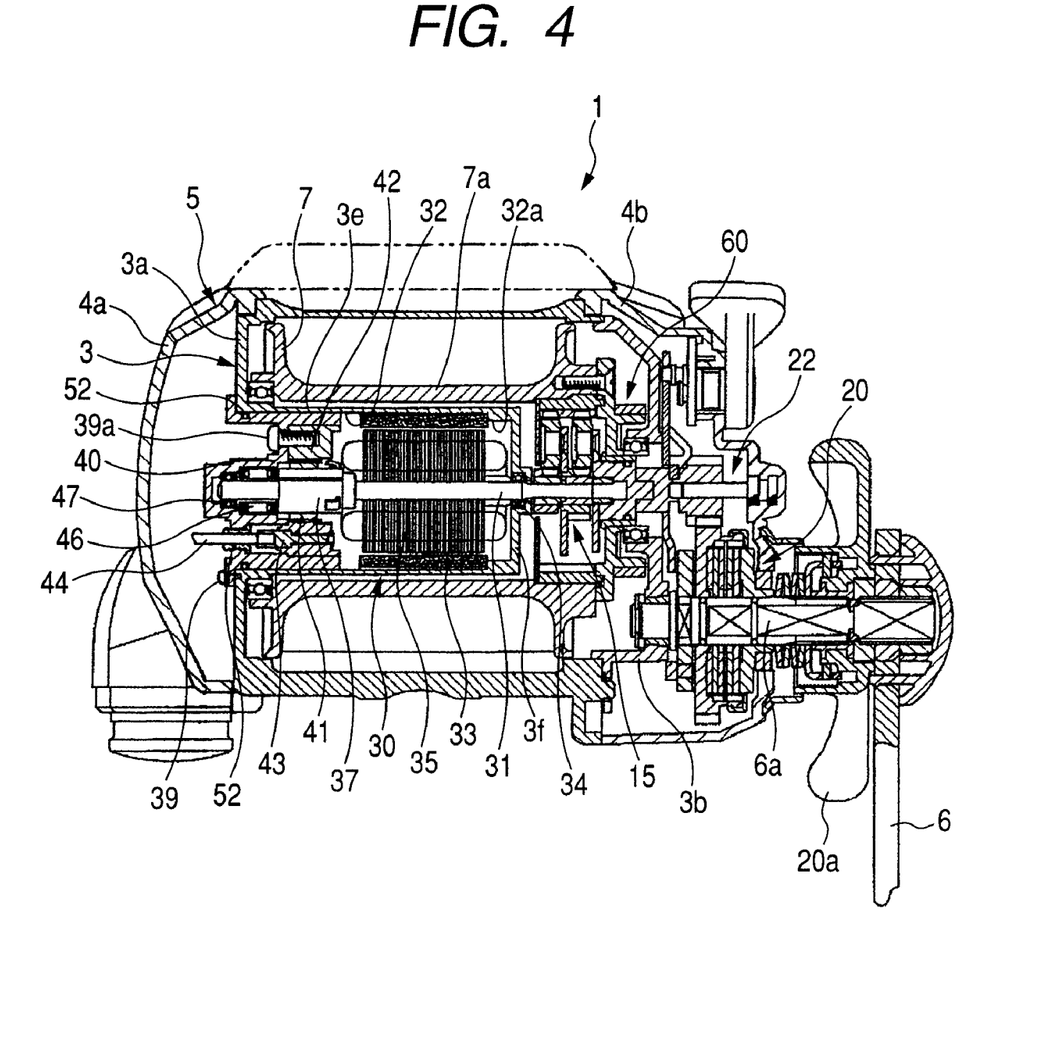
FIG. 4 shows a cross-section of an internal structure of an electric reel viewed from the rear according to a second embodiment of the invention.
Figure 5:
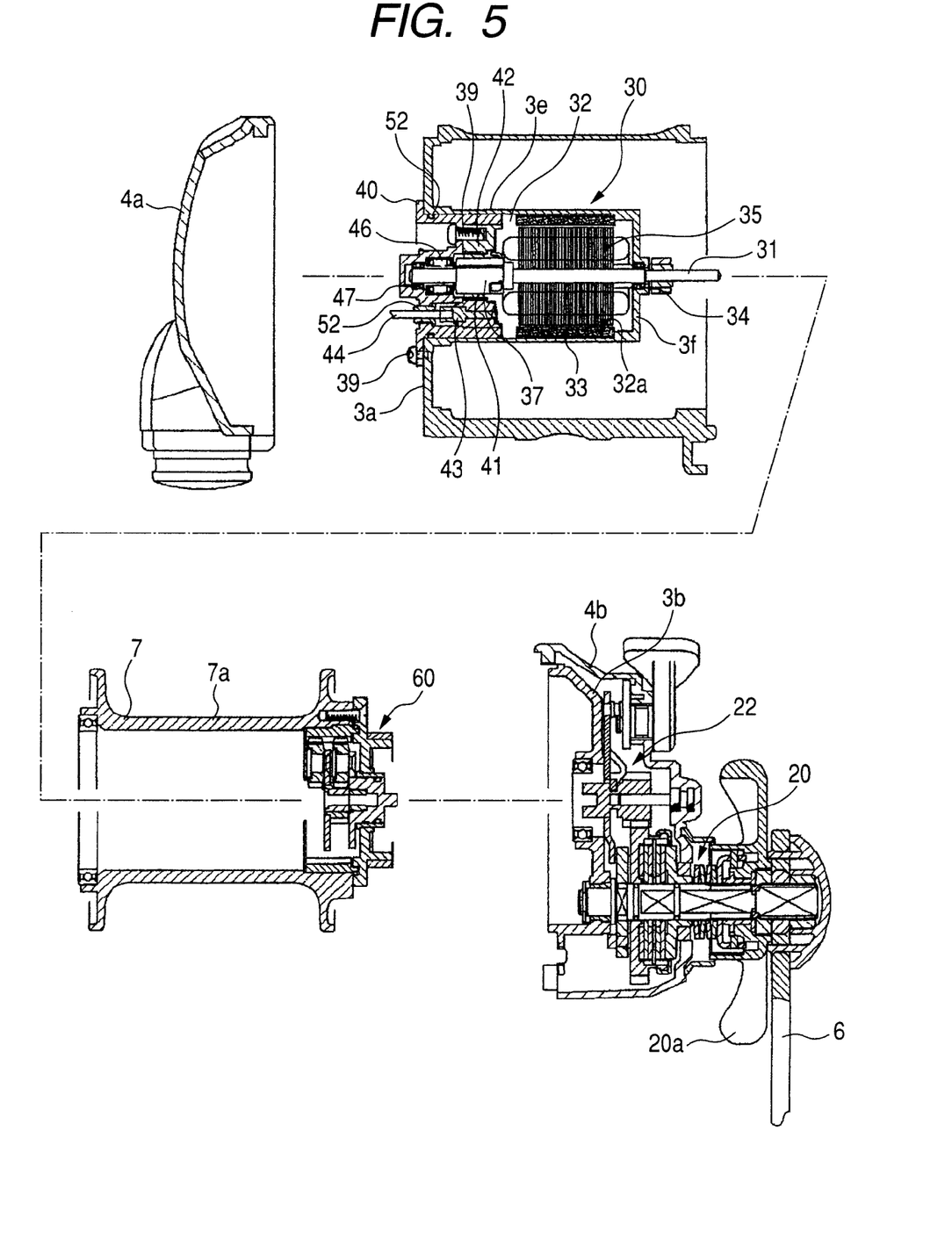
FIG. 5 is an exploded view of the structure of the driving motor part.

The second embodiment of the invention will be described referring to FIGS. 4 and 5. FIG. 4 shows a cross-section of an internal structure viewed from the rear. FIG. 5 is an exploded view of the structure of the driving motor part.

While the driving motor 30 is arranged ahead of the spool 7 of the reel body 5 in the first embodiment, the driving motor 30 is arranged inside the spool 7 (so-called spool-in type) in the second embodiment. In FIGS. 4 and 5, a portion having the same function as that in the first embodiment is given the same reference sign.

In this embodiment, a cylindrical projecting part 3e protruding toward the right side plate is integrated with the left frame 3a constituting the frame 3 and a concave part 32 is formed on the projecting part. The projecting part 3e has a size accommodated in the internal space formed in the spool 7 on which a fishline is wound. The magnet 33 constituting a magnetic field is mounted on the inner surface 32a of the concave part 32 along the circumferential direction. In this example, the magnet 33 may be fixed to the inner surface 32a with an adhesive or locked thereto with holding means, or plural magnets 33 may be mounted at predetermined spacings along the circumferential direction. A yoke forming a magnetic circuit may be mounted on the magnet 33 or the projecting part 3e may be provided with the function of such a yoke.

The projecting part 3e including the concave part 32 formed thereon has an opening in a position facing a left side plate and a bottom wall 3f formed thereon in a position facing a right side plate. The front frame 3c rotatably supports, at the center of the bottom wall 3f, the driving shaft 31 of the driving motor 30 via a bearing 34.

The driving shaft 31 has an armature 35 (coil opposed to the magnet 33) as a component member of the driving motor 30 in a position opposed to the magnet 33 mounted on the inner surface 32a of the concave part 32 and a commutator 37 providing an electric current to the armature 35 mounted on the outer surface of the armature 35 in axial direction. The left frame 3a on which the projecting part 3e is formed incorporates a brush 41 coming into contact with the commutator 37 and a brush holder 42 holding the brush attached and fixed to the inner surface thereof in the radial direction with a screw 39a. A terminal 43 is integrated into the brush holder 42 for connection to an external power source via a lead wire 44.

An end cover 40 is attached to the opening in the projecting part 3e so as to be detachable to the projecting part 3e by way of a fastening screw 39 threaded into the left frame 3a. The end cover 40 is previously formed as a single unit and incorporates, in the order from the innermost position in axial direction, a one-way clutch 46 for rotatably supporting the driving shaft 31 and a bearing 47 rotatably supporting the driving shaft 31. In this example, the one-way clutch 46 does not freewheel when the manual handle 6 is rotated and allows the driving shaft 31 to rotate only in one direction so as to transmit power to the spool 7 when the driving motor is driven.

A known driving force transmitting mechanism 60 including a decelerating mechanism is arranged on the projecting part 3e in a position facing the right side plate between the spool 7 and the driving shaft 31 so as to input a rotary driving force of the manual handle 6 and the driving motor 30 from the spool 7.

In this way, with an electric reel including a spool-in type driving motor 30, the motor housing part has a single structure thus reducing the fishline winding drum part 7a of the spool. It is thus possible to employ a spool having enhanced fishline winding capacity with a reel body of the current size.

As in the foregoing embodiments, the portion where the driving motor 30 is mounted may be changed as required. The structure of the reel body may be also changed as required.

While embodiments of the invention have been described, the invention is not limited to the foregoing embodiments but may be changed in a variety of ways. For example, the driving force transmitting mechanism 12, 60 may use power transmission by way of a gear train or a driving force transmitting system may be consolidated on one side plate, or other modifications are possible. Any driving motor may be used as long as a magnet generating a magnetic field is attached inside a concave part formed on the reel body. Configuration and arrangement of other components may be variously changed. Configuration of the drum mechanism 20 or clutch mechanism 22 as well as its arrangement mode may be variously changed.

Third Embodiment

Figure 6:
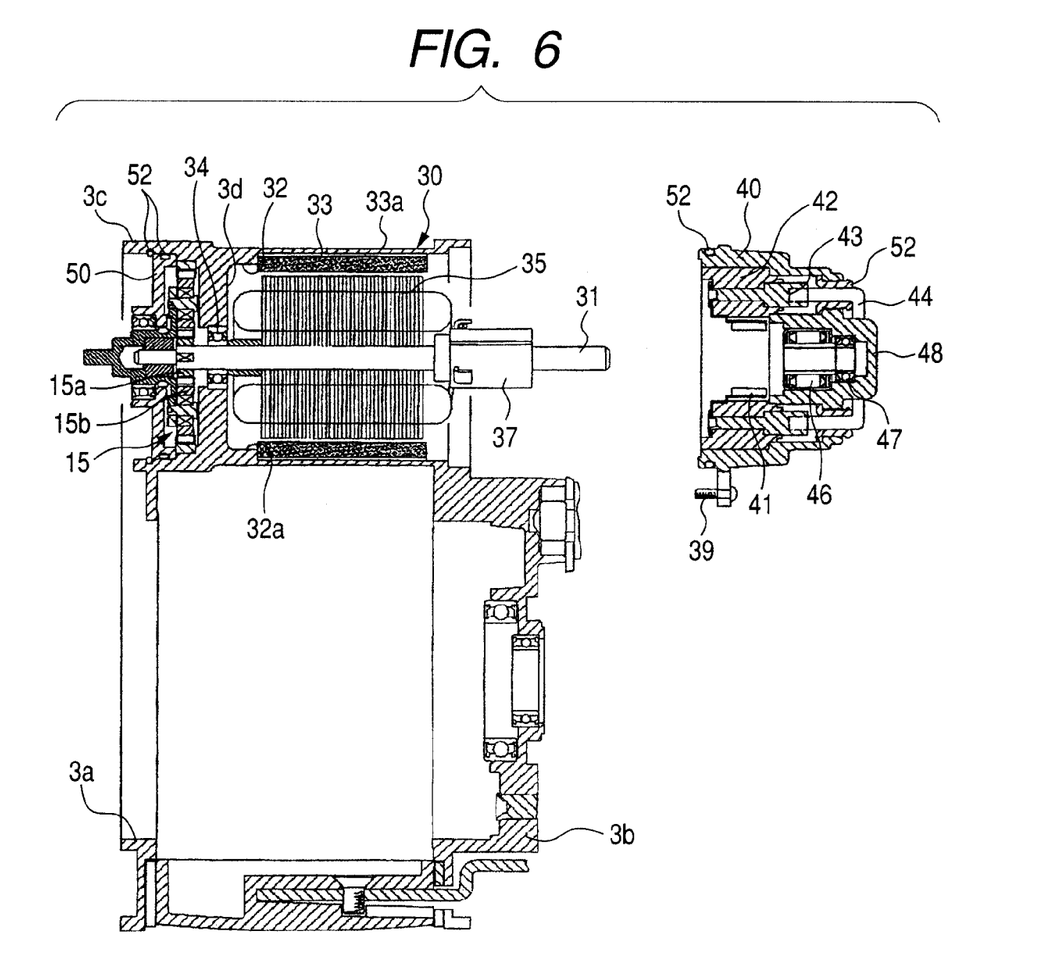
FIG. 6 is an exploded view of main parts of the electric reel according to a third embodiment of the invention.
Figure 7A:
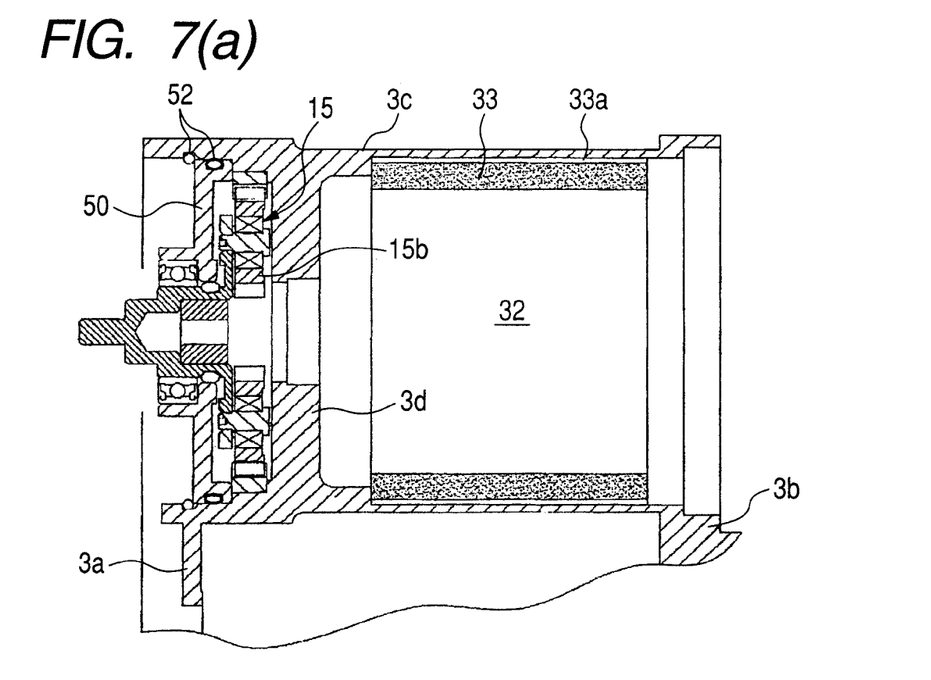
FIG. 7A is a partial plan view showing a main part of the main body of the electric reel.
Figure 7B:
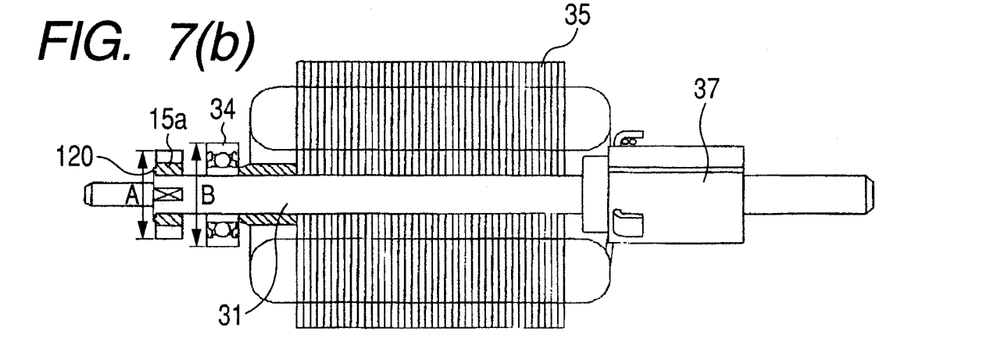
FIG. 7B is a plan view showing an armature and a driving shaft.
Figure 7C:
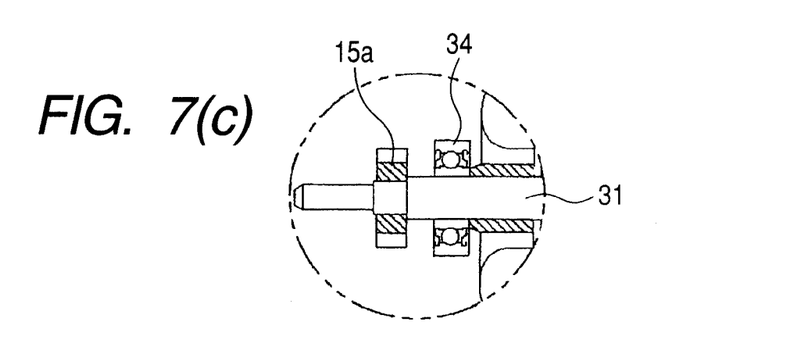
FIG. 7C is an enlarged view of the driving shaft.

FIGS. 6 to 7C show the third embodiment of the invention. This embodiment is a variation of the first embodiment and a component common to that in the first embodiment is given the same reference sign and the corresponding detailed description is omitted.

In the first embodiment, the sun gear 15a of the decelerating mechanism (planetary gear mechanism) 15 and the bearing 34 are left on the reel body 5 when the end cover 40 is removed and the minimum unit components 33, 35 constituting the driving motor 30 are individually removed. In the third embodiment, the bearing 34 and the sun gear 15a are integrated with the output shaft 31. Thus, when the end cover 40 is removed, the bearing 34 and the sun gear 15a are removed together with the output shaft 31 from the reel body 5.

To be more precise, in this embodiment, the sun gear 15a and the bearing 34 are attached and locked to the output shaft 31 and a motor core unit composed of the output shaft 31 including the armature 35, the bearing 34 and the sun gear 15a integrated together is detachable from the concave part 32. The outer diameter A of the sun gear 15a is smaller than the outer diameter B of the bearing 34 so that the bearing 34 and the sun gear 15a may be pulled out together with the output shaft 31 from the bottom wall 3d of the front frame 3c.

As shown in FIG. 7B, a method for attaching and locking the sun gear 15a and the bearing 34 to the output shaft 31 may be fixing the sun gear 15a to the output shaft 31 through swaging (a swaging part 120 is shown in FIG. 7B) with the sun gear 15a held non-rotatably to the output shaft 31. Or, as shown in FIG. 7C, the sun gear 15a may be fixed to the circumference of the output shaft 31 by way of press fitting or bonding. The bearing 34 may be attached and locked to the output shaft 31 in a similar fashion. In case swaging is applied, a non-circular fitting part of the sun gear 15a (or bearing 34) and the output shaft 31 necessary for preventing rotation of the sun gear 15a (or bearing 34) is desirably minimized to provide a larger circular fitting part in order to enhance the concentricity of the sun gear 15a (or bearing 34) and the output shaft 31.

As described above, the output shaft 31 together with the bearing 34 and the sun gear 15a is made detachable from the concave part 32, that is, with the sun gear 15a and the bearing 34 attached and locked to the output shaft 31, the backlash of the sun gear 15a engaged with the planetary gear 15b with respect to the output shaft 31 can be prevented and an abnormal noise generated when the sun gear 15a is engaged with the planetary gear 15b can be prevented. In other words, in case the sun gear 15a is detachably fitted to the output shaft 31 in a non-rotatable fashion (first embodiment), a backlash could occur, due to a slight clearance between the sun gear 15a and the output shaft 31 for the fitting and attaching/detaching purposes, between the sun gear 15a and the output shaft 31, with possible abnormal noise occurring in engagement. The configuration of this embodiment is free from such problems. According to this embodiment, the sun gear 15a and the bearing 34 may be assembled, together with the output shaft 31 (including the armature 35), as a motor core unit, into the reel body 5. This eliminates the restriction on the assembling order, such as setting the armature 35 to the frame 3 before assembling the sun gear, thus enhancing the workability and maintainability.

Fourth Embodiment

Figure 8A:
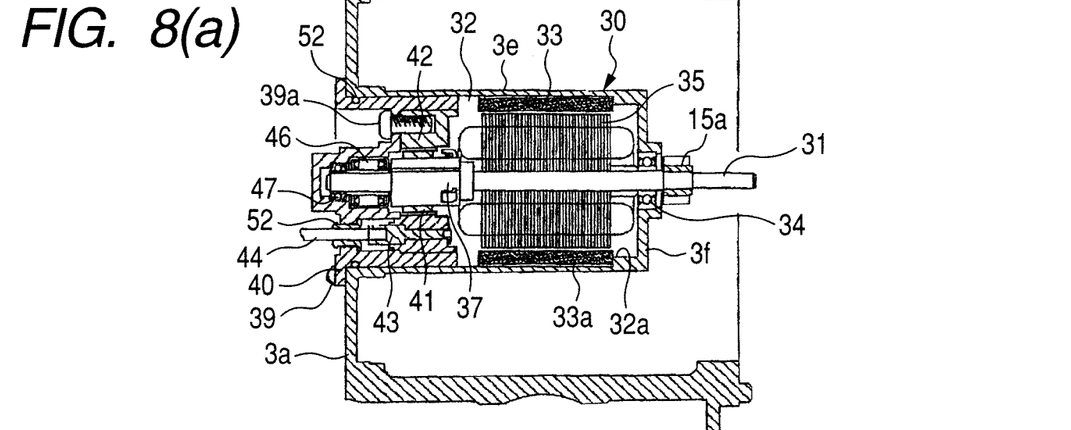
FIGS. 8A to 8C are exploded views showing a structure of an electric reel according to a fourth embodiment of the invention.
Figure 8B:
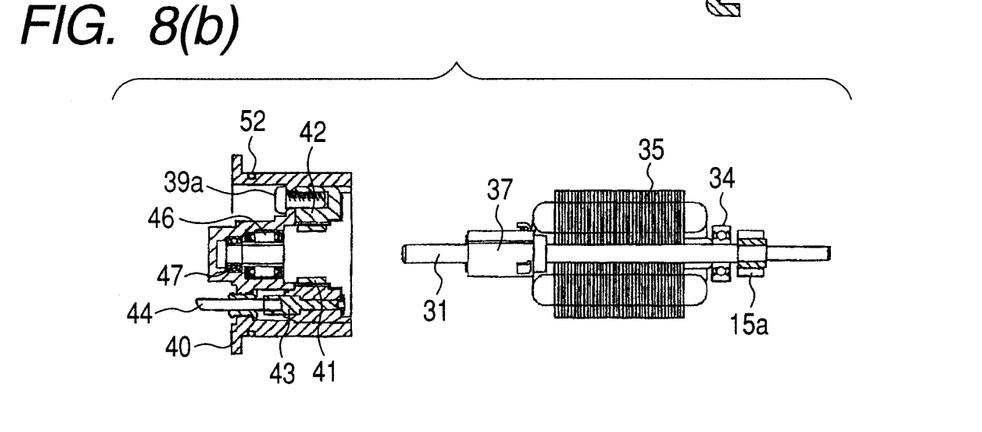
Figure 8C:
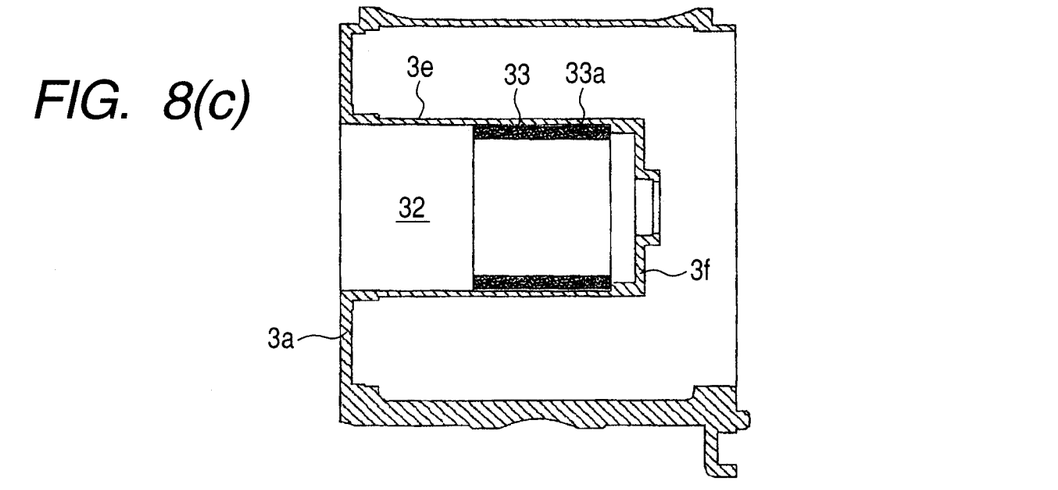

FIG. 8 shows the fourth embodiment of the invention. This embodiment is a variation of the second embodiment and a component common to that in the second embodiment is given the same reference sign and the corresponding detailed description is omitted.

In the second embodiment, the sun gear of the decelerating mechanism (planetary gear mechanism) 15 and the bearing 34 are left on the reel body 5 when the end cover 40 is removed and the minimum unit components 33, 35 constituting the driving motor 30 are individually removed. In the fourth embodiment, the bearing 34 and the sun gear 15a are integrated with the output shaft 31. Thus, when the end cover 40 is removed, the bearing 34 and the sun gear 15a are removed together with the output shaft 31 from the reel body 5. The configuration necessary to provide such a structure is that same as that in the third embodiment and thus the corresponding detailed description is omitted. This configuration offers the same working effect as that of the third embodiment.

What is claimed is:

1. An electric reel for fishing comprising:
a reel body that includes side plates and a concave part;
a spool rotatably supported between the side plates;
a driving shaft including an armature rotatably arranged inside the concave part; and
a magnet that constitutes a magnetic field and is mounted on an inner surface of the concave part so as to be opposed to the armature to form a driving motor for driving and rotating the spool
wherein the concave part is formed on the reel body positioned ahead of the spool.

2. The electric reel according to claim 1, wherein
the reel body includes a frame on which a driving force transmitting mechanism is mounted and to which the side plates are attached, and
the concave part is integrally formed with the frame.

3. The electric reel according to claim 1 further comprising a detachable cover body for covering an opening in the concave part to make replaceable components of the driving motor including at least one of the armature and the magnet provided in the concave part.

4. The electric reel according to claim 3 further comprising:
   a planetary gear mechanism including a sun gear for decelerating and transmitting a rotation of the driving shaft to the spool; and
   a bearing for rotatably supporting the driving shaft to the reel body in proximity to the planetary gear mechanism, wherein the sun gear and the bearing are attached and locked to the driving shaft.

5. The electric reel according to claim 1 further comprising a cover body for covering an opening in the concave part,
   wherein a bearing for rotatably supporting the driving shaft and a one-way clutch for allowing the driving shaft to rotate in one direction and inhibiting the driving shaft from rotating in the other direction are retained inside the cover body.

* * * * *